United States Patent Office 3,008,131
Patented Nov. 7, 1961

3,008,131
QUALITY ACCOUNTING
Robert P. Einsel and William E. Van Horne, Columbus, Ohio, assignors to Industrial Nucleonics Corporation, a corporation of Ohio
Filed July 28, 1958, Ser. No. 751,223
7 Claims. (Cl. 340—179)

This invention relates generally to automatic accounting means, and more specifically it relates to an electronic system for continuously analyzing the output of an industrial processing apparatus and periodically providing a written summary of the performance of the apparatus and the quality of the product.

The invention will be illustrated and described in connection with an industrial processing machine producing finished or semifinished material in a continuous flow. For the purpose of providing a still more concrete and specific example, the invention will be described in connection with an apparatus for analyzing the output of a continuous electroplating line such as a tin plate line. It will be understood, however, that such specific and detailed description is given by way of example only, since a great many other uses and embodiments in connection with similar or different continuous production apparatus or other evaluation systems are contemplated and will be apparent to those concerned with industrial testing, quality control, or automatic accounting systems in general.

In a co-pending application, Serial No. 698,867, filed November 25, 1957, by Robert P. Einsel, and entitled "Product Analysis," there is described an apparatus for analyzing the continuously formed product of a high speed production line. In the example herein given of a tin plate line, a comprehensive inspection and analysis of each foot of tin plated strip issuing from the machine may require such an analyzer which routinely delivers an uninterrupted flow of digital quality information at an average rate in excess of 20,000 bits per minute. This information flow may comprise, for example, fifteen parallel pulse trains adapted to operate conventional electronic counters which summarize the analyzer data.

While the production of tin plate is substantially continuous, as is the automatic analysis thereof, the grading, pricing, and distribution of the strip is done on the basis of discrete units; commonly as coils of finished tin plate which are delivered from the windup of the electroplating line about every five minutes.

It is essential that each coil of tin plate be positively identified and correlated with the data comprising the analysis thereof, and the cumulative totals included in the analysis should be complete and accurate to the nearest foot. Furthermore, these essential objectives should be accomplished without the imposition of a significant extra burden on operating personnel, whose duties are already complex and involve a multiplicity of details requiring constant attention and fine coordination to maintain the operation of the process at top efficiency.

In accordance with this invention there is provided an inspection and quality accounting system whereby coil identities and complete quality analyses are rendered by automatic means which delivers the necessary information in the form of typewritten sheets and/or punch cards or other permanent record which may serve as a guide to the grading, pricing and eventual use of the tin plate or other product. Of equal importance, there is provided a means for obtaining concise but comprehensive data concerning the overall performance of the tin plate line and the degree of statistical control exercised thereover.

In order to separate the continuous flow of analyzer data into discrete blocks after the manner in which the continuous flow of material is separated into production units (e.g., coils), duplicate counter banks are provided. Thus while one counter bank is accumulating data on an accumulating coil of tin plate, the completed set of data on the preceding coil may be read out of the other counter bank. The transfer of the information flow from one counter bank to the other is effected instantaneously and automatically upon actuation of the shear which severs the strip to separate one coil of tin plate from the next. Hence there is no loss of data during the finite time required for the automatic typewriter to print out the information stored in the counters.

The use of duplicate counter banks has a further advantage in that it admits of a period of idleness for the bank of counters which have been read out, during which period the idle counters and the read-out devices may be automatically checked for proper performance by means of a novel self-testing system described hereinafter.

It is an object of this invention to provide means for continuous automatic accounting of qualitative and quantitative variables affecting a material product.

It is another object to provide means for comprehensive analysis of a continuous flow of material product, including means for automatic presentation of the analysis in a most useable form.

Still another object is to provide means for independently summarizing discrete blocks of a continuous information flow on one or a plurality of channels in precise correlation with the separation of a continuous material flow into discrete units of the product.

It is a further object to provide means for obtaining separation, summary, and immediate read-out of such information blocks without loss of data on the information channels.

It is a still further object to provide means for identifying each product unit with the automatically written analysis thereof.

It is also an object to provide quality accounting apparatus adapted to handle a continuous flow of data while accommodating periodic use of an automatic self-testing routine for monitoring the performance of the system.

Still another object is to provide such an apparatus including means for permanently recording the results of each self-testing operation, concomitantly following the written analysis of each product unit.

It is an additional object to provide quality accounting apparatus in accordance with the above objects which requires a minimum of attention by operating personnel.

Other objects and advantages will become apparent in the following detailed description, taken in connection with the accompanying drawings, in which.

Figure 1A:
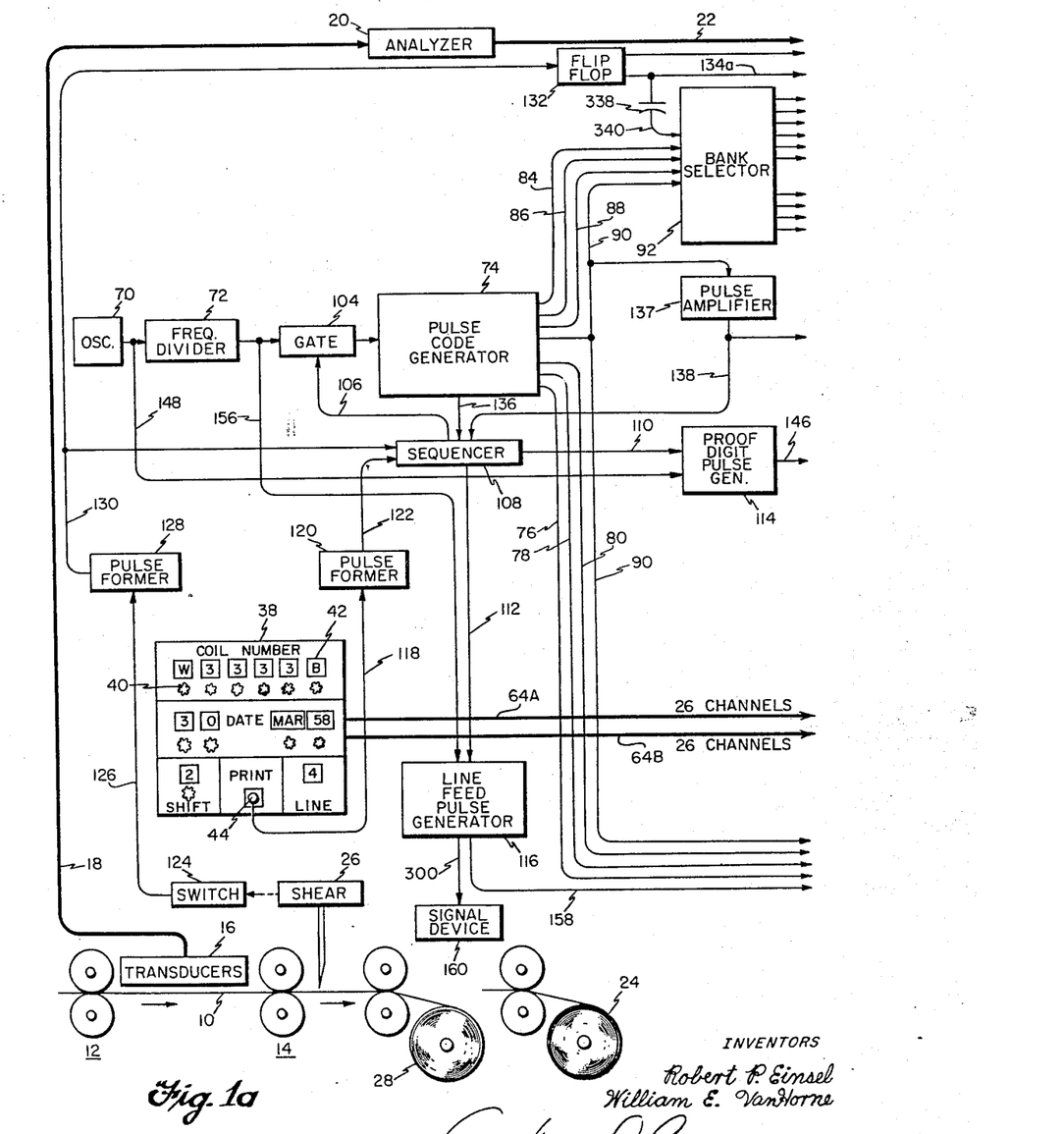
FIGURES 1a and 1b, when mutually connected as by lines 22 and 158, comprise a showing of an overall system for quality accounting in connection with a tin plate production line, in accordance with one preferred embodiment of the invention.
Figure 1B:
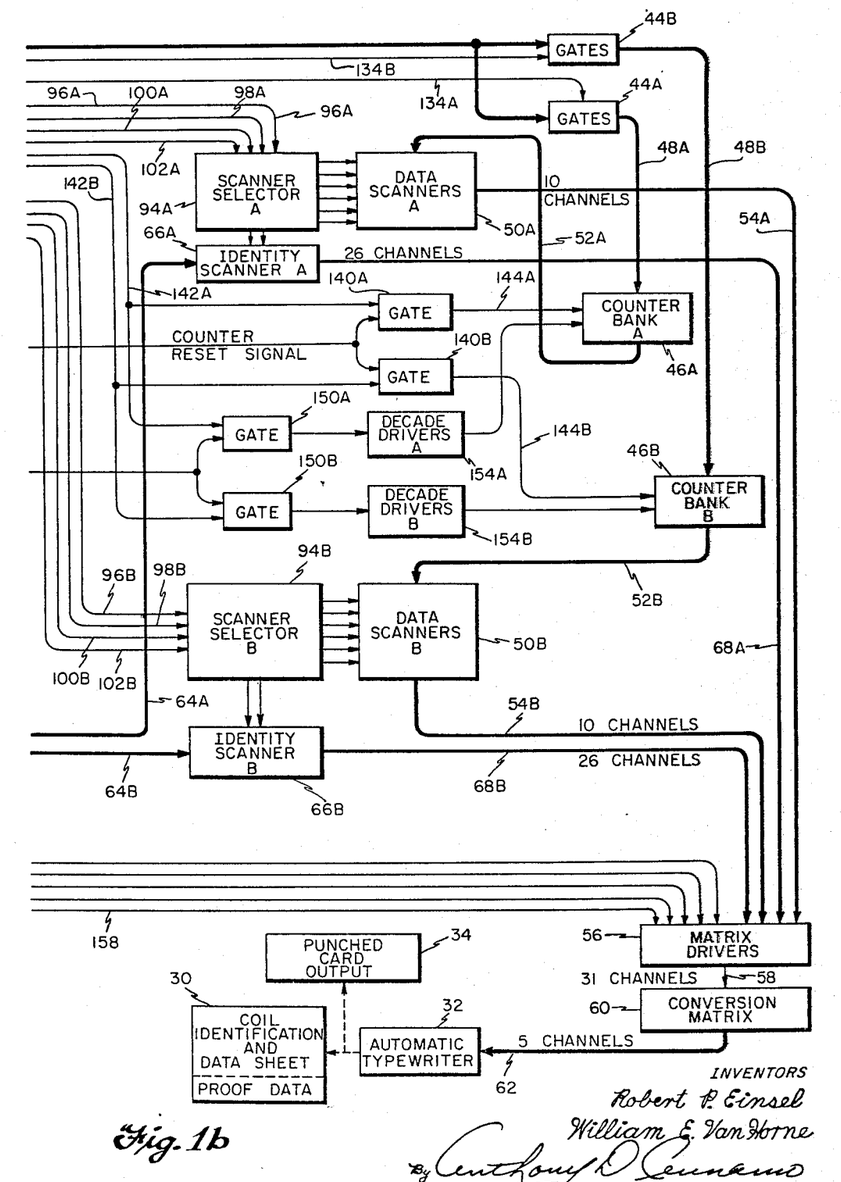

Referring to FIGURES 1a and 1b, which depict a preferred embodiment of the invention and a typical use therefor, there is shown the delivery section of a tin plate line. In accordance with this invention, the strip 10 issuing from the electroplater is passed through an inspection station located between two successive roll sets 12 and 14. The inspection apparatus comprises a plurality of transducers at 16 for detecting various physical properties of the strip 10. These properties include quantitative values and/or absolute defects which singly or in combinations determine the quality of the tin plate.

The indications obtained from transducers 16 are fed through a multiconductor cable 18 into an analyzer 20, wherein the information is processed in accordance with the description provided by the disclosure of the co-pending application above cited. The output of the analyzer consists of parallel pulse trains adapted to trigger a bank of parallel counters, whereby each counter may accumulate a figure for the total number of unit lengths (e.g., feet) of strip having a particular characteristic of interest. Thus the exemplary apparatus shown in the co-pending application may provide a pulse train on each of fifteen channels, adapted to actuate counters for:

(1) Total number of unit lengths inspected; and total number of unit lengths having—
(2) Insufficient overall strip thickness.
(3) Excess overall strip thickness.
(4) Insufficient thickness of top plating.
(5) Excess thickness of top plating.
(6) Insufficient thickness of bottom plating.
(7) Excess thickness of bottom plating.
(8) Insufficient total plating thickness.
(9) Excess total plating thickness.
(10) Visual defects, top.
(11) Visual defects, bottom.
(12) Pinholes.
(13) Prime quality.
(14) Secondary quality.
(15) Waste quality.

Cable 22 in FIGURE 1 represents the fifteen channel output of such an analyzer.

The strip 10, issuing continuously from the electroplating line, is wound into successive coils as at 24. When such a coil is completed, the strip is immediately severed by a shear 26, and the winding of the next coil 28 is begun. Inasmuch as a modern tin plate line may produce strip at speeds up to about 1500 feet per minute, a coil is completed about every five minutes.

The electronic apparatus of FIGURE 1 is an automatic accounting system which delivers a printed document 30 identifying each coil of strip produced and summarizing the quality data obtained from the analyzer 20. The document 30 is produced by an automatic typewriter 32 which is also adapted to provide punch cards 34 for use in conventional accounting machines to obtain concise information concerning the overall functioning of the tin plate line. The document 30 also bears proof data serving as a check on the proper operation of the counting circuits and readout system.

The coil identity information is inserted by the machine operator on an identity panel 38 provided at the operator's station. The identity information may consist of the coil number, the date, the work shift, and production line number as shown; the coil number per se consisting of a prefix letter, four numerals and a suffix letter. Generally, for each alphabetic or numerical symbol in the coil identity, there is provided a coding switch equipped with a dial as at 40. The symbol selected by each dial appears in a corresponding window as at 42. This system is both convenient and substantially error-eliminating, since generally only one symbol in the identity needs to be changed between coils, and all symbols to be inserted are plainly visible before and after the actual printing thereof, which takes place automatically when the print pushbutton 44 is depressed.

The routing of information to the printer is outlined by the heavy black lines. Thus information from the transducers 16 is routed through line 18 to the analyzer 20. The fifteen-channel output of the analyzer on line 22 is alternately gated by two parallel sets of gates 44A and 44B into counter bank 46A through line 48A and into counter bank 46B through line 48B. Each bank contains fifteen counters, one counter for each channel of the analyzer data. Each counter in turn preferably comprises five decade counter tubes in cascade.

The counter banks are duplicated for the most part to prevent loss of incoming analyzer data while accumulated data is being printed out. Thus when counter bank 46A is being read out, gates 44A block the incoming data which is then routed by gates 44B into counter bank 46B, and vice versa.

Stored information in counter banks 46A and 46B, which information in the illustrated case comprises 750 bits per bank, is respectively presented to data scanners 50A and 50B through connections 52A and 52B. The data scanners may in turn sequentially present the information in decimal code on lines 54A and 54B to a set of matrix drivers 56. The matrix drivers are connected by a thirty-one channel conductor 58 to a conversion matrix 60, which converts each of the thirty-one outputs of the matrix drivers into a five-channel code on line 62 for driving the operating magnets of the typewriter 32.

The coil identity information set into the identification panel 38 is presented on lines 64A and 64B respectively to identity scanner 66A and identity scanner 66B. In the identity channels, a number may share one channel with a letter, the character to be printed being selected by shifting the typewriter to upper or lower case as required. Thus each of lines 64A and 64B comprises twenty-six channels to accommodate the alphabetic data. The identity scanners are provided to sequentially present the identity information in alphabetic code on lines 68A and 68B to the matrix drivers 56.

The typewriter 32 is preferably of the type which is manufactured by the Commercial Controls Corporation and marketed under the trade name "Flexowriter." This device has a printing rate of about 9.5 characters per second, which is accommodated by the use of a ninety-five c.p.s. oscillator 70 and a ten-to-one frequency divider 72, the pulse output of the latter providing the timing for the scanning and printing operations.

The machine functions of letters shift, figures shift, space and carriage return are initiated by the pulse output of a pulse code generator 74 which is connected to the matrix drivers 56 by lines 76-80 and line 90. The pulse code generator also provides pulse signals on lines 84-90 for controlling the operation of the identity and data scanners. These signals are routed to the proper bank of scanners through a bank selector 92. Since each bank of scanners includes a coil identity scanner and three counter data scanners, each bank has an associated scanner selector; 94A and 94B. Signal pulses on lines 84-90 comprising code signals for initiating the functions of selector advance, scanner advance, scanner homing and selector homing are routed by the bank selector 92 onto the proper group of lines 96A-102A or 96B-102B connecting the bank selector to the scanner selectors 94A and 94B. In turn the scanner selectors distribute the code signals for initiating scanner advance and scanner homing in appropriate sequence to the proper scanners 50A and 66A or 50B and 66B.

The programmed pulse output provided by the pulse code generator 74 is paced by the clock pulse output of the frequency divider 72. The clock pulses are admitted to the pulse code generator input through a gate 104. The signal controlling the gate 104 is provided on line 106 by a sequencer 108.

The sequencer 108 has two other outputs 110 and 112 which respectively control a proof digit pulse generator 114 and a line feed pulse generator 116, to be described. The sequencer, also to be described further, coordinates the operation of the system, to a major extent in accordance with identity print signals and shear signals.

The identity print signal is initiated when the operator is ready to insert the coil identification information on the identification panel 38, and to that end he presses the print pushbutton 44. It is seen that the pushbutton switch 44 is connected by means of line 118 to a pulse-forming network 120 which provides a single pulse input on line 122 to the sequencer 108 when the pushbutton 44 is operated.

The shear signal is initiated automatically when the shear 26 severs a completed coil from the exiting strip 10. It is seen that the shear 26 operates an associated switch 124 connected by line 126 to a further pulse forming network 128 identical with pulse former 120. The shear pulse network 128 provides a single pulse output on line 130 which goes to another input of the sequencer 108. It is seen also that line 130 further provides an input to a flip-flop 132. The flip-flop has alternate outputs 134A and 134B which control the respective gates 44A and 44B. These gates route the fifteen channel output 22 of the analyzer 20 alternately into counter banks 46A and 46B.

Further description of the system of FIGURES 1a and 1b will be more easily understood in connection with a brief description of the overall functioning thereof, which follows:

A preprinted form sheet is inserted into the typewriter 32. The operator sets the coil identity information on panel 38 and presses pushbutton 44. Pulse former 120 develops a triggering pulse on line 122 which trips the sequencer 108. A gate signal provided on line 106 by the sequencer opens gate 104, allowing the clock pulses from the frequency divider 72 to advance the pulse code generator 74.

Assuming that the output data from the analyzer 20 is accumulating in counter bank "A" and that the "A" scanners have been selected by the bank selector 92, a scanner selector 94A will now route the scanner advance pulses from the pulse code generator 74 to identity scanner 66A, causing the latter to effect a symbol-by-symbol scanning of the coil identity information appearing on the identification panel 38. Including the necessary spacing and shifting back and forth between letters and figures on the typewriter 32, it requires thirty-two code bits from the pulse code generator 74 to type out the coil identity information. On the thirty-second bit, a pulse is generated on line 136 which is returned to an input of the sequencer 108. This pulse causes the sequencer to close gate 104, preventing the clock pulses from the frequency divider 72 from further advancing the pulse code generator 74. The coil identity has now been printed on the record sheet 30. Further activity now ceases awaiting the completion of the coil of tin plate, except that processed data on the material comprising the coil is being accumulated in counter bank 46A.

Upon completion of the coil, the strip is served by the shear 26, and as hereinabove described a shear signal pulse is generated on line 130. The shear pulse triggers the flip-flop 132, thereby blocking the analyzer output through gates 44A into counter bank 46A, and permitting the analyzer data for the next coil to enter counter bank 46B through gates 44B.

The shear pulse on line 130 also triggers the sequencer 108, which again opens the gate 104, allowing the clock pulses from the frequency divider 72 to again advance the pulse code generator 74. Scanner selector 94A selects the first data scanner in the group 50A which is advanced through twenty-five points to print out five of the fifteen counters in counter bank 46A. This action is duplicated for each of the other two scanners in group 50A to complete the printout of the counter data.

The last code bit from the pulse code generator 74 provides a pulse on line 90 which triggers a pulse amplifier 137. The amplifier delivers an amplified pulse on line 138. The pulse on line 90, through a connected matrix driver in group 56, returns the typewriter carriage. The pulse on line 138 provides a counter reset signal which is presented to gates 140A and 140B. These gates are controlled by the bank selector 92 through lines 142A and 142B. In this case, gate 140A will pass the counter reset pulse to counter bank 46A through line 144A to cause a resetting of all counters therein to zero.

The pulse on line 138 is also delivered to an input of the sequencer 108, which in turn produces a pulse on line 110 comprising a trigger input to the proof digit pulse generator 114. Thereupon the generator 114, after a time delay sufficient to permit the counters to reset, delivers nine spaced pulses on line 146. The spacing of these pulses is controlled by the frequency of oscillator 70, whose output on line 148 is connected directly to generator 114. The nine-pulse output of generator 114 is presented to a pair of gates 150A and 150B. These gates are controlled by the bank selector 92 through lines 142A and 142B. In this case, gate 150A passes the nine pulses to a set of decade drivers 154A while gate 150B blocks the input to the other set of decade drivers 154B. When triggered by the proof digit pulse generator 114, the drivers 154A insert nine pulses into each decade of counter bank 46A, so that the same will be filled up with nines. The counter reset and count of nine operations are completed while the typewriter carriage is returning to the left end.

Although the pulse code generator 74 has completed its program, the gate 104 is not cut off, since it is desired to print out the nines now standing in the counter bank 46A as a check figure. Accordingly the pulse code generator 74 is allowed to completely recycle, causing the reprinting of the coil identity information followed by nines in all the figure spaces which in the previous instance received analyzer data from counter bank 46A. In this instance further the pulse code generator is not cut off by the thirty-second code bit therefrom on line 136, due to a binary function of the sequencer 108 to be described hereinafter. Due to a further binary function of the sequencer, the last code bit from the pulse code generator, which triggers pulse amplifier 137 to produce a pulse on line 138, in this instance causes the sequencer 108 to close gate 104, thus cutting off the pulse code generator at the end of its second complete cycle.

When the counters 46A are reset to zero for the second time, the sequencer 108, instead of triggering the proof digit pulse generator 114, now triggers the line feed pulse generator 116. Thereupon generator 116 generates preferably fifteen spaced pulses in step with the clock pulse output of frequency divider 72 on line 156. These fifteen pulses are fed over line 158 to a matrix driver in the group 56, causing the line spacer of typewriter 32 to advance fifteen spaces in preparation for the entry on sheet 30 of the data on the next coil of tin plate. Upon delivering the last of the fifteen pulses, generator 116 resets itself, simultaneously triggering a signal device 160 which notifies the operator to enter the identifying number for the next coil on panel 38.

On the next coil, the sequence of operations described, beginning when the operator set the coil identity information on panel 38 and pressed pushbutton 44, will be repeated, except that the operations described for the "A" section will be performed by the "B" section, and vice versa.

Figure 2A:
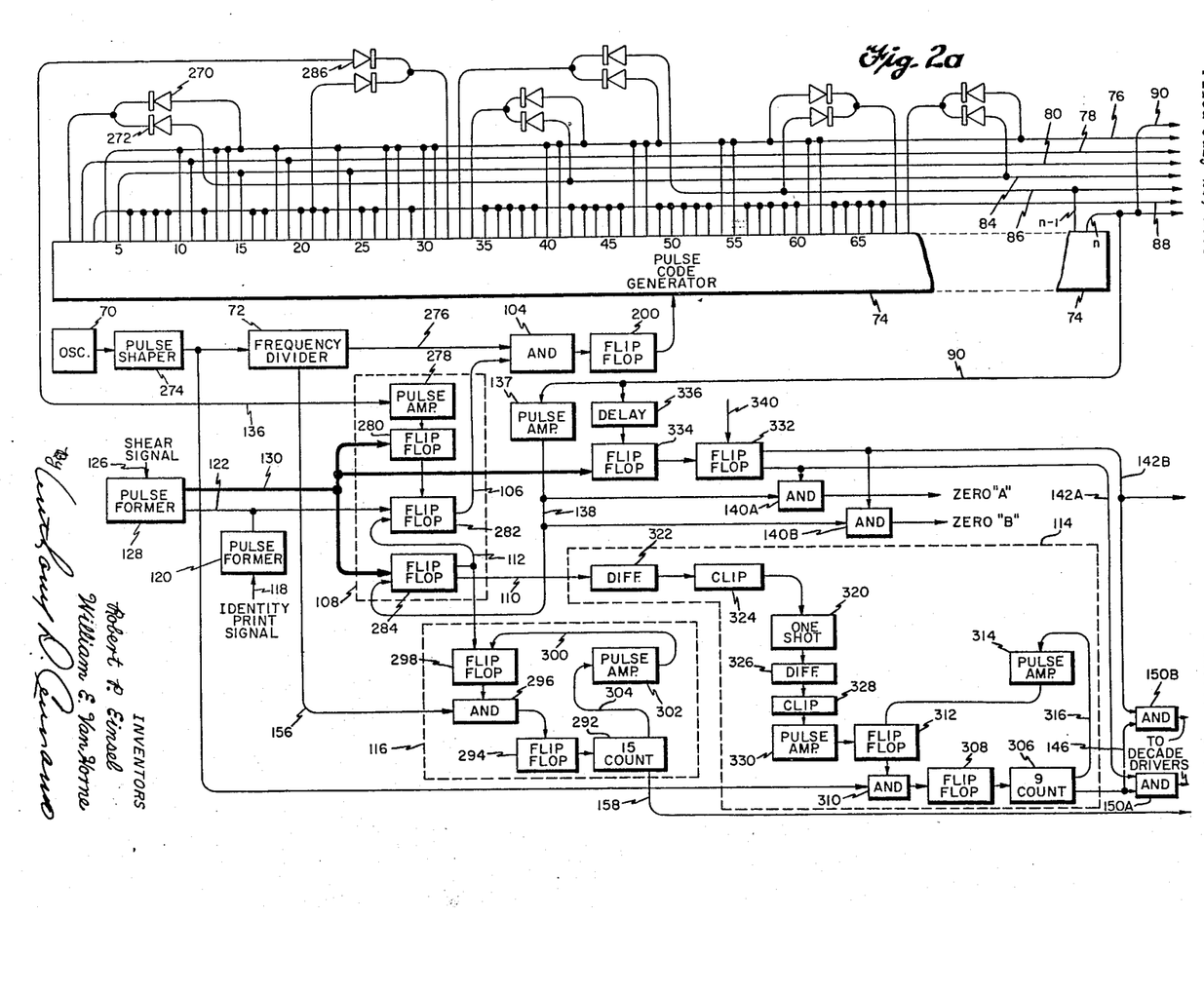
FIGURES 2a and 2b, when mutually connected as by lines 90 and 158, illustrate in greater detail portions of the apparatus of FIGURES 1a and 1b.
Figure 2B:
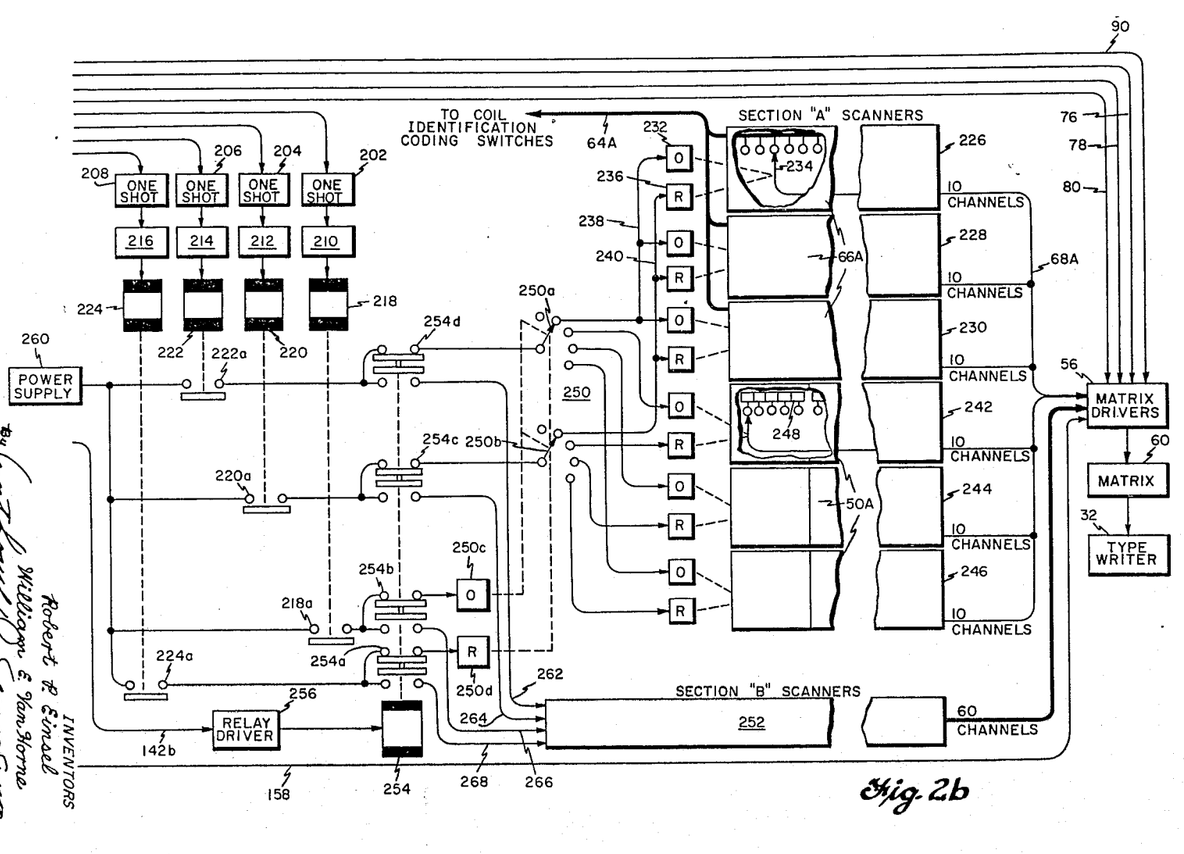

FIGURES 2a and 2b, when mutually connected as by lines 90 and 158, comprise a more detailed showing of portions of the readout and sequencing system of the invention, including the novel self-checking feature associated with the counters and readout circuits.

The pulse code generator 74 preferably comprises a plurality of decade counter tubes such as magnetron beam switching tubes, in an arrangement such as is fully described in U.S. Patent No. 2,810,903, issued October 22, 1957, to Donald H. Lee, particularly in connection with FIGURE 4 of that patent. When driven by an alternating switching voltage such as is provided by one output of a flip-flop 200, the generator 74 delivers a single pulse on each of its sequentially numbered outputs in succession and in a repeating cycle. These pulses are delivered to lines 76–80 and 84–90. Lines 76–80 and line 90 are connected to the matrix drivers 56 so that pulses on these lines initiate typewriter functions as follows:

| Line | Function |
| --- | --- |
| 76 | space. |
| 78 | letters shift. |
| 80 | figures shift. |
| 90 | carriage return. |

Lines 84-90 are respectively connected to the inputs of one-shot multivibrators 202-208. These multivibrators control the operation of corresponding driver amplifiers 210-216 which drive a set of relays 218-224. Relays 218-224 control the operation of the identity and data scanners, as well as the scanner selectors.

The scanners are herein illustrated for simplicity as a bank of stepping switches, although suitable electronic gating systems of known character may be employed to read out the counters and coil identity coding circuits. Thus the identity scanner 66A may comprise a set of three ten-level stepping switches 226, 228 and 230 providing thirty channels to more than accommodate the twenty-six letters of the alphabet required in the coil identity data. Each stepping switch is equipped with the conventional operate (O) and release (R) magnets. For example, the numeral 232 indicates the operate magnet which advances the ten-level wiper 234 of switch 226, while the numeral 236 indicates the release magnet which homes the same. It is seen that the operate magnets of stepping switches 226, 228 and 230 are connected in parallel by line 238, and similarly the release magnets of these three switches are parallel-connected by line 240.

The data scanners 50A may consist of three independently actuated stepping switches 242, 244 and 246 each having ten levels to accommodate the ten elements of a decade counter tube. In the illustrated system, the fifteen five-digit counters as at 248 require seventy-five such counter tubes, which are accommodated by the use of three twenty-five point switches.

The scanner stepping switch or switches to be operated are selected by a scanner selector stepping switch 250. Section 250a of the scanner selector switch has its stationary contacts connected to the operating magnets (O) of the scanner stepping switches, while section 250b similarly connects to the release magnets (R) thereof. The scanner selector switch 250 is also equipped with the conventional operate 250c and release 250d magnets.

The scanners and scanner selector system described comprise the "A" section which functions on alternate coils of tin plate as hereinabove described. An identical arrangement is used to form the "B" section, which is merely indicated as a diagrammatic block 252.

The selection of the "A" or "B" section is effected by a bank selector relay 254 operated by a relay driver 256 so that its coil is energized or de-energized in accordance with the presence or absence of a signal on line 142B.

A power supply 260 is provided for actuating the operate and release magnets of the scanner and scanner selector stepping switches in accordance with the functioning of relays 218-224, which in turn are triggered by the programmed pulse output of the pulse code generator 74. Thus when the bank selector relay 254 is de-energized as shown, the scanner selector switch 250 is caused to advance one step when a circuit is completed from the power supply 260 through contacts 218a of relay 218, and contacts 254b of the bank selector relay 254 to the operate magnet 250c of the selector switch. The selector is homed when the release magnet 250d is energized through relay contacts 224a and 254a. When the selector is in the position shown, it is seen that when the scanner advance relay contacts 222a are closed, power is applied through contacts 254d of the bank selector relay and through section 250a of the selector to the operate magnets as at 232 of scanner switches 226-230. Similarly, when the scanner homing relay contacts 220a are closed, power is applied through relay contacts 254c and selector switch section 250b to the release magnets of the scanner switches. It is apparent that when the bank selector relay 254 is energized, similar functions are effected in the "B" section 252 which is connected to the alternate relay position contacts through lines 262-268.

Referring to the typical coil identity data:

W 3333 B 30 MAR 58 2 4 set on panel 38 of FIGURE 1, the thirty-two code bits required to print out this data will effect the typewriter and scanner functions shown in Table 1.

In Table 1, the notation "DC" indicates a pulse on one of the data channels as the scanner advances one step. All other pulses are initiated by the pulse code generator 74 and routed to the lines indicated.

TABLE 1
*Coil identity read-out sequence*

| Code bit | Typewriter function | Line pulsed | Scanner function | Line pulsed |
| --- | --- | --- | --- | --- |
| 1 | space | 76 | selector step | 84 |
| 2 | letters shift | 78 | | |
| 3 | letter | DC | scanner step | 88 |
| 4 | space | 76 | | |
| 5 | figures shift | 80 | | |
| 6-9 | figure | DC | do | 88 |
| 10 | space | 76 | | |
| 11 | letters shift | 78 | | |
| 12 | letter | DC | do | 88 |
| 13-14 | space | 76 | | |
| 15 | figures shift | 80 | | |
| 16-17 | figure | DC | do | 88 |
| 18 | space | 76 | | |
| 19 | letters shift | 78 | | |
| 20-22 | letter | DC | do | 88 |
| 23 | space | 76 | | |
| 24 | figures shift | 80 | | |
| 25-26 | figure | DC | do | 88 |
| 27-28 | space | 76 | | |
| 29 | figure | DC | do | 88 |
| 30-31 | space | 76 | | |
| 32 | figure | DC | do | 88 |

It will be noted that when two lines are connected to a single output of generator 74, the connections are made through rectifier diodes so that the generator is allowed to pulse two lines at a single step but pulses originating elsewhere on either of the two lines may not be cross-coupled to the other line. For example, output No. 1 of the generator 74 is so connected to lines 76 and 84 through diodes 270 and 272.

Following the thirty-second code bit, the pulse code generator 74 is wired for a repeating sequence as shown in Table 2.

TABLE 2
*Data read-out sequence*

| Code bit | Typewriter function | Line pulsed | Scanner function | Line pulsed |
| --- | --- | --- | --- | --- |
| 33 | space | 76 | scanner home | 86 |
| 34 | do | 76 | selector step | 84 |
| 35-39 | figure | DC | scanner step | 88 |
| 40-41 | space | 76 | | |
| 42-46 | figure | DC | do | 88 |
| 47-48 | space | 76 | | |
| 49-53 | figure | DC | do | 88 |
| 54-55 | space | 76 | | |
| 56-60 | figure | DC | do | 88 |
| 61-62 | space | 76 | | |
| 63-67 | figure | DC | do | 88 |

Code bits 68-102 now repeat the sequence of 33-67 and code bits 103-137 repeat the sequence of 33-67.

It is seen that the thirty-third code bit homes the identity stepping switches 226-230, and that the thirty-fourth bit advances the scanner selector switch 250 to enable the first counter data scanner switch 242 to be actuated. As the scanner switch 242 is advanced through its twenty-five points, the readings of five five-digit counters as at 248 are printed out; the readings of the counters being separated by two spaces as indicated in connection with code bits 40-41 in the above table. Similar action is taken in the case of scanner switches 244 and 246.

The last code bit output of the pulse code generator 74 is designated as $n$. In the example given, $n$ represents the number one-hundred thirty-nine. It is seen that the $n-1$ code bit will home the scanner switch 246 and the $n^{th}$ code bit will home the selector switch 250, thus completing the readout of the counter bank and the resetting of the scanners.

As hereinabove explained, the pulse code generator 74 is switched at a rate determined by the frequency of the oscillator 70. The oscillator pulses are shaped by a pulse shaper 274 and applied to a frequency divider 72 which preferably comprises a single decade counter employed as a count-down to deliver one clock pulse on line 276 for each ten pulses at its input. The delivery of the clock pulses to the generator switching flip-flop 200 is controlled by the AND gate 104 so as to pass the pulses to the flip-flop only when a signal is present on line 106 from the sequencer 108.

The elements of the sequencer, which are enclosed by the dotted line 108, include a pulse amplifier 278 and three flip-flops 280–284.

The pulse amplifier 278 has its input connected via line 136 and a rectifier 286 to the thirty-second output of the pulse code generator 74. The output of the pulse amplifier 278 provides a trigger input to the reset flip-flop 280. The reset flip-flop is provided with a further input from the output 130 of the shear signal pulse former 128.

The output of flip-flop 282 provides the signal on line 106 which controls the AND gate 104. Flip-flop 282 is responsive to input signals from any one of four sources including the print signal pulse network 120, the shear signal pulse network 128, the output of the reset flip-flop 280, and one of the two outputs 112 of flip-flop 284. Output 112 is also utilized to trigger the line feed pulse generator 116. The other output 110 of flip-flop 284 is utilized to trigger the proof digit pulse generator 114.

The line feed pulse generator 116 comprises elements in FIGURE 2a which are enclosed by the dotted line 116. The generator elements include a counter 292, which may comprise an abbreviated form of the pulse code generator 74 hereinabove described, adapted to be driven by one output of a flip-flop 294. Flip-flop 294 is driven in turn by a clock pulse output of the frequency divider 72 on line 156 when said pulses are passed by an AND gate 296. The signal controlling this AND gate is provided by the output of a flip-flop 298 which is turned on by a pulse at the output 112 of the flip-flop 284. The flip-flop 298 is turned off at the termination of the count by a pulse on line 300 provided by a pulse amplifier 302 when a signal is delivered on line 304 by the counter to indicate the end of the count. While counting, the counter-generator 292 also functions in the manner of pulse code generator 74 to deliver fifteen pulses to line 158 to actuate the typewriter line space function.

The proof digit pulse generator 114, the elements of which are enclosed by dotted line 114, is similar to the line feed pulse generator 116 in that it employs a counter 306 switched by a flip-flop 308 adapted to be driven by a pulse source gated by an AND gate 310 in accordance with the state of a gate control flip-flop 312 which may be turned on by the sequencer 108 and turned off by a pulse amplifier 314 when the counter 306 delivers a pulse to the input 316 thereof signaling the end of the count.

Generator 114 differs from generator 116 only in that it is a nine-count unit rather than a fifteen-count unit, and it is adapted to be switched at ten times the rate of generator 116 by the output of the pulse shaper 274 on line 148. While counting, the counter-generator 306 functions in the manner of pulse code generator 74 to deliver nine spaced pulses via line 146 to the AND gates 150a and 150b which route the proof digit pulses to the proper set of decade drivers in the manner described hereinabove in connection with FIGURES 1a and 1b.

The gate control flip-flop 312 is adapted to be triggered on by one output 110 of flip-flop 284 in the sequencer 108. Means are provided for delaying this triggering action, which delay means comprises a one shot multivibrator 320 and associated differentiating and clipping circuits. Accordingly when the flip-flop 284 changes state so as to produce a rise in potential on line 110, the potential rise is differentiated and clipped by circuits 322 and 324 connecting line 110 to the input of the one-shot 320 so as to trigger the same. The output of the one-shot 320 is connected to the trigger input of the gate control flip-flop 312 through differentiating and clipping circuits 326–328 and a pulse amplifier 330. The clipper 328 removes the leading portion of the differentiated pulse output of the one-shot 320, so that the pulse amplifier will be triggered at the end of a delay interval equal to the duration of the pulse provided by the one-shot.

The AND gates 150A and 150B, which receive the nine-pulse output on line 146 of the proof digit pulse generator, are controlled by signals on lines 142A and 142B respectively. These signals are provided by the alternate outputs of a first order flip-flop 332. As is shown in FIGURES 1a and 1b, the signals on lines 142A and 142B also control the AND gates 140A and 140B which route the counter reset pulse to counter banks 46A and 46B.

The first order flip-flop 332 is switched by one output of a zero order flip-flop 334 whose input is connected through a delay circuit 336 to line 90 which is energized by the $n^{th}$ output of the pulse code generator 74. The delay circuit 336 may be similar to the delay system 320–330 employed in the trigger circuit of the proof digit pulse generator 114. The flip-flops 332 and 334 together with the bank selector relay 254 comprise one preferred form of the bank selector 92 shown in FIGURE 1a.

An overall description of the functioning of the quality accounting system follows. This description can be better understood with reference to Table 3, which shows the binary state of the several flip-flops at various points in the operating sequence. In the description, the numbers in parentheses indicate the steps numbered in Table 3.

Assume that data from the process analyzer is accumulating in counter bank "A," and that in response to the alert signal the operator has changed the coil identity setting and pressed the print pushbutton. The resulting identity print signal (1) pulse triggers the flip-flop 282, whose output 106 opens the AND gate 104, allowing the output 276 of frequency divider 72 to drive the flip-flop 200 whose one output in turn switches the pulse code generator 74. Immediately after the coil identity has been printed out, the thirty-second output (2) of the pulse code generator 74 will deliver a pulse through rectifier 286 to line 136, triggering the pulse amplifier 278. The output pulse from the amplifier triggers flip-flop 280, whose one output in turn resets flip-flop 282, which closes AND gate 104, thus preventing further advance of pulse code generator 74.

TABLE 3

*Flip-flop switching sequence*

| Step | Event | 280 | 282 | 284 | 334 | 332 |
|---|---|---|---|---|---|---|
| 0 | Start | 0 | 0 | 0 | 0 | 0 |
| 1 | Print signal "A" | 0 | 1 | 0 | 0 | 0 |
| 2 | 32-bit #1 | 1 | 0 | 0 | 0 | 0 |
| 3 | Shear signal "A" | 1 | 1 | 0 | 0 | 0 |
| 4 | n-bit #1 | 1 | 1 | 1 | *1 | 0 |
| 5 | 32-bit #2 | 0 | 1 | 1 | 1 | 0 |
| 6 | n-bit #2 | 0 | 0 | 0 | *0 | *1 |
| 7 | Print signal "B" | 0 | 1 | 0 | 0 | 1 |
| 8 | 32-bit #3 | 1 | 0 | 0 | 0 | 1 |
| 9 | Shear signal "B" | 1 | 1 | 0 | 0 | 1 |
| 10 | n-bit #3 | 1 | 1 | 1 | *1 | 1 |
| 11 | 32-bit #4 | 0 | 1 | 1 | 1 | 1 |
| 12 | n-bit #4 | 0 | 0 | 0 | *0 | *0 |

*Change of state is delayed by circuit 336.

At the end of the accumulating coil of tin plate, a shear signal (3) pulse from the pulse former 128 is delivered to line 122 and triggers flip-flop 282, again opening the AND gate 104 and allowing the pulse code generator 74 program to proceed. It is noted that the shear pulse forming network 128 has another output on line 130 which has no effect in the normal operation sequence and which is explained further hereinafter. When the pulse code generator has advanced to the end of its program, the data in counter bank 46A (FIG. 1b) will have been printed out. The pulse code generator 74 will then reset automatically.

The $n^{th}$ code bit (4) from pulse code generator 74 appearing on line 90 initiates the typewriter carriage return and also triggers pulse amplifier 137 and the delay circuit 336. The output of the pulse amplifier on line 138 is passed by the AND gate 140A to zero all counters in bank 46A. After an interval, the delay circuit 336 triggers flip-flop 334, but due to the binary action of 334, the flip-flip 332 does not change state. The output of pulse amplifier 137 on line 138 also triggers flip-flop 284 in the sequencer 108. The flip-flop 284 in turn generates a pulse on line 110 which triggers the proof digit pulse generator 114. After a time delay sufficient to permit the counters in bank 46A to reset, the generator 114 produces nine spaced pulses on line 146, and these pulses are passed by the AND gate 150A to energize the decade drivers 154A (FIG. 1), thus inserting a count of nine into each decade of the counters.

The pulse code generator 74 now begins another cycle of operation. When the thirty-second output (5) of the generator produces a pulse on line 136, pulse amplifier 278 resets flip-flop 280. Due to the binary nature of the output of flip-flop 280, however, the state of flip-flop 282 is unchanged, so that the AND gate 104 remains open and generator 74 continues to advance. When the generator completes its second cycle, the coil identity print-out has been repeated and nines have been printed in each counter data space on sheet 30.

The $n^{th}$ output (6) of generator 74 again triggers the pulse amplifier 137 and delay circuit 336. The amplifier output pulse on line 138 again passes AND gate 140A, resetting the counters in bank 46A to zero. The pulse on line 138 also resets flip-flop 284 in the sequencer 108. The output 112 of flip-flop 284 resets flip-flop 282 which thereupon removes the gate control signal on line 106 so that AND gate 104 closes, thus disabling pulse code generator 74 which has now reset. The output 112 of flip-flop 284 also triggers the line feed pulse generator 116. When generator 116 resets itself as above described, the pulse on line 300 triggers the signal device 26 (FIG. 1a) whereby the operator is alerted to insert the identification data for the next coil of tin plate.

After an interval, the delay circuit 336 resets flip-flop 334 which in turn triggers the first order bank selector flip-flop 332. Flip-flop 332 discontinues the signal on line 142A, thus closing AND gates 140A and 150A. The other output line 142B of flip-flop 332 is now energized instead, thus enabling AND gates 140B and 150B and energizing the bank selector relay 254 so that the scanners are placed in condition for extracting the data now accumulating in counter bank 46B.

In Table 3 it will be noted that the sequence of steps (7–12) is identical with the above described sequence (1–6) except that the bank selector flip-flop 332 remains in the "one" state rather than the zero state.

Referring to the shear pulse former network 128, it is seen that this network has one output 122 in common with the print signal pulse former 120. The other output 130 of the shear pulse former is shown connected by heavy black lines to one input of each of flip-flops 280, 284 and 334. The input 130 to each of these flip-flops is a conventional reset input which has no effect in normal operation. Its purpose is to automatically synchronize the states of these flip-flops in the event that they should be out of step for some reason such as a servicing operation. Accordingly when the shear pulse occurs, if flip-flop 280 is not already in the "one" state (see Table 3) the shear pulse on line 130 will place it in that state. Similarly if flip-flops 284 and 334 are not in the "zero" state when the shear pulse arrives, they will be driven to that state by the pulse.

Referring again to FIGS. 1a and 1b, it will be recalled that the shear pulse on line 130 also provides the input to flip-flop 132 which controls the gates 44A and 44B. The condition of these gates determines the alternate routing of counter input information to counter banks 46A and 46B. It is apparent that the particular counter bank which is accumulating data at any given time is the one which must be read out after the next shear signal arrives. Accordingly the operation of the bank selector 92 must be synchronized with the operation of gates 44A and 44B. To this end, and in order that a possible out of step condition can be automatically corrected, the bank selector flip-flop 332 is provided with a conventional synchronizing input 340 connected through capacitor 338 to line 135A which controls gates 44A. When the gate control signal is impressed on line 134A a pulse of one polarity is impressed on line 340; and when the gate control signal is discontinued, line 340 receives a pulse of the opposite polarity. If the existing state of flip-flop 332 is not compatible with the polarity of the synchronizing pulse, the flip-flop will be driven to the opposite state and thereby its operation sequence will be brought into synchronism with the sequence of flip-flop 132.

While only one selected embodiment of the present invention has been shown and described herein, it will be apparent that many modifications, many outwardly similar or quite different embodiments, and many other uses of the invention may be made within the letter of the appended claims and the range of equivalents thereof.

What is claimed is:

1. A system for recording quality analyses of product units assembled from a continuous material flow, comprising means for testing successive elements of said material flow for a plurality of qualities, means in connection with said testing means for generating a plurality of electrical information signal trains each indicative of successive tested values of one of said qualities, first and second data storage banks, each of said banks including a plurality of registers each corresponding to one of said signal trains for adding said successive tested values signaled thereby and for continuously registering the cumulative result of said additions; routing means for said signal trains including a switching means having a first alternative state wherein said signal trains are conducted to said first storage bank, a second alternative state wherein said signal trains are conducted to said second storage bank and means energized by a transfer signal for actuating said switching means from its existing state to the opposite state; means activated on completion of each of said product units for generating said transfer signal, and means activated by said transfer signal for recording the contents of said registers in the storage bank selected by said switching means in said existing state thereof.

2. A system as in claim 1 wherein said recording means comprises a printer, first and a second means respectively for scanning said registers in said first and second storage banks, a cyclical programmer for said printer and said scanning means, and a second switching means for selecting said first and second scanning means alternately on successive cycles of said programmer.

3. A system as in claim 2 including digital means for encoding a word consisting of a plurality of characters for identifying said product units, manually adjustable means for selecting each character in said word, means for visually indicating each of said selected characters, means for sequentially scanning said encoded characters of said word, means for programming said last mentioned scanning means and said printer to print said word, and switch means for initiating operation of said last mentioned programming means.

4. A system as in claim 1 wherein said routing means comprises a first and second plurality of gates connected in alternate transmission paths for said signal trains to said first and second storage banks, and a flip-flop circuit switched by said transfer signal for controlling said gates, said flip-flop having a first alternate output for enabling said first plurality of gates and a second alternate output for enabling said second plurality of gates.

5. A system for recording quality analyses of product units assembled from a continuous material flow, comprising means for testing successive elements of said material flow for a plurality of qualities, means in connection with said testing means for generating a plurality of electrical information signal trains each indicative of successive tested values of one of said qualities, first and second data storage banks, each of said banks including a plurality of registers each corresponding to one of said signal trains; routing means for said signal trains including a first switching means having a first alternative state wherein said signal trains are conducted to said first storage bank, a second alternative state wherein said signal trains are conducted to said second storage bank and means energized by a transfer signal for actuating said switching means from its existing state to the opposite state; means activated on completion of each of said product units for generating said transfer signal, a printer, first and second means respectively for scanning said registers in said first and second storage banks, a cyclical programmer for said printer and said scanning means, a second switching means actuated on completion of a cycle of said programmer for selecting said first and second scanning means alternately on successive cycles of said programmer, and means responsive to the coincidence of asynchronism between said first and second switching means and a change of state of said first switching means for actuating said second switching means so as to interchange said scanning means selected thereby.

6. A system for recording quality analyses of product units assembled from a continuous material flow, comprising means for testing successive elements of said material flow for a plurality of qualities, means in connection with said testing means for generating a plurality of electrical information signal trains each indicative of successive tested values of one of said qualities, first and second data storage banks, each of said banks including a plurality of registers each corresponding to one of said signal trains; routing means for said signal trains including a first switching means having a first alternative state wherein said signal trains are conducted to said first storage bank, a second alternative state wherein said signal trains are conducted to said second storage bank and means energized by a transfer signal for actuating said switching means from its existing state to the opposite state; means activated on completion of each of said product units for generating said transfer signal, a printer, first and second means respectively for scanning said registers in said first and second storage banks, a cyclical programmer for said printer and said scanning means, a second switching means including a binary element actuated on completion of each cycle of said programmer for selecting said first and second scanning means alternately on every other one of the successive cycles of said programmer, a program start control energized by said transfer signal for starting said programmer, a program stop control including a binary element switched by said programmer at the completion of each cycle thereof for allowing said programmer to complete a first and a second cycle before stopping the same, means triggered by said programmer at the end of said cycles for resetting said registers in the storage bank selected by said first switching means in said existing state thereof, means triggered by said programmer at the end of said first cycle for generating a test information signal train and means for routing said test signal train to said last mentioned registers, whereby said printer will record arbitrary test figures encoded in said test signal train on said second cycle of said programmer.

7. A system as in claim 6 wherein said means for generating said test signal train includes means for delaying the delivery thereof pending said resetting of said registers.

References Cited in the file of this patent
UNITED STATES PATENTS

| | | |
|---|---|---|
| 2,679,644 | Lippel | May 25, 1954 |
| 2,680,240 | Greenfield | June 1, 1954 |
| 2,855,584 | McCarroll | Oct. 7, 1958 |
| 2,891,237 | Sink | June 16, 1959 |
| 2,922,990 | Anderson | Jan. 26, 1960 |